US008885119B2

(12) United States Patent
Noh et al.

(10) Patent No.: US 8,885,119 B2
(45) Date of Patent: Nov. 11, 2014

(54) DISPLAY DEVICE COMPRISING A LIGHT-SOURCING UNIT FIXING FRAME WITH A LATERAL EXTENSION PORTION AND A FIXING PROTRUSION WHICH INTERLOCKS THE LIGHT-SOURCING UNIT FIXING FRAME TO A HOUSING

(71) Applicant: Samsung Display Co., Ltd., Yongin (KR)

(72) Inventors: Cheol Yong Noh, Cheonan-si (KR); Jae Chang Choi, Yongin-si (KR); Seong Sik Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/199,666

(22) Filed: Mar. 6, 2014

(65) Prior Publication Data
US 2014/0185324 A1    Jul. 3, 2014

Related U.S. Application Data

(62) Division of application No. 12/896,802, filed on Oct. 1, 2010, now Pat. No. 8,704,974.

(30) Foreign Application Priority Data

Oct. 12, 2009    (KR) .................. 10-2009-0096871

(51) Int. Cl.
*G02F 1/1335* (2006.01)
*G02F 1/1333* (2006.01)
*G09F 13/04* (2006.01)
*F21V 7/04* (2006.01)
*F21V 8/00* (2006.01)

(52) U.S. Cl.
CPC ............ *G02B 6/0081* (2013.01); *G02B 6/0085* (2013.01); *G02B 6/009* (2013.01); *G02F 2001/133314* (2013.01)
USPC ............... 349/65; 349/58; 362/97.3; 362/632

(58) Field of Classification Search
USPC .............. 349/62–65, 67; 362/97.1–97.4, 611, 362/612, 613, 615, 632–634
See application file for complete search history.

(56) References Cited

U.S. PATENT DOCUMENTS

2007/0097284 A1    5/2007  Ho et al.
2008/0232134 A1*   9/2008  Weng et al. .................. 362/612

FOREIGN PATENT DOCUMENTS

JP    2007-311327    11/2007

* cited by examiner

*Primary Examiner* — Paul Lee
(74) *Attorney, Agent, or Firm* — Innovation Counsel LLP

(57) ABSTRACT

A backlight assembly of a Liquid Crystal Display (LCD) is provided with improved heat dissipation capabilities. The improved dissipation capabilities come from one or more light-sourcing unit fixing frames that have extensions which protrude to outside a housing that houses light sourcing units of the LCD. The light-sourcing unit fixing frames mechanically interlock with the housing.

4 Claims, 13 Drawing Sheets

DISPLAY DEVICE COMPRISING A LIGHT-SOURCING UNIT FIXING FRAME WITH A LATERAL EXTENSION PORTION AND A FIXING PROTRUSION WHICH INTERLOCKS THE LIGHT-SOURCING UNIT FIXING FRAME TO A HOUSING

This application is a divisional application of U.S. patent application Ser. No. 12/896,802 filed on Oct. 1, 2010, which claims priority to Korean Patent Application No. 10-2009-0096871 filed on Oct. 12, 2009 where the disclosures of both said applications are incorporated herein by reference in their entirety.

BACKGROUND

1. Field of Disclosure

The present disclosure of invention relates to a backlight assembly and a display device having the same, and more particularly to a backlight assembly with improved heat dissipation capability and simplified structure and a display device having the backlight assembly.

2. Description of Related Technology

Liquid crystal displays (LCDs) are one of the most widely used types of flat panel displays. Generally, an LCD includes a pair of substrates having electrodes and a liquid crystal layer interposed between the substrates. In an LCD, voltages are applied to spaced apart electrodes to generate an electric field therebetween. The electric field passes through the liquid crystal layer and determines the alignment of liquid crystal molecules in the liquid crystal layer, thereby controlling polarization and ultimately an amount of light that passes through the Liquid Crystal Display (LCD) device. As a result, a desired image may be displayed on the LCD device.

Because the LCD panel itself functions as an electronically controlled light valve and does not originate its emitted light, LCD display panels typically include a backlight assembly that provides light to a backside portion of the display panel. Backlight assemblies are classified into direct-type backlight assemblies and edge-lit-type backlight assemblies according to the position of the light sources (e.g., fluorescent lamps or LEDs).

Recently, display devices are increasingly required to become more compact and lighter and have better color reproducibility. Thus, research is being conducted to use point light sources, such as light-emitting diodes (LEDs), as the light sources of backlight assemblies. In particular, heat dissipation becomes a problem as the panels and backlight assemblies are made more compact. Too much heat can lead to deterioration of the light sources. If an adequate heat dissipation structure which can efficiently remove heat generated by LEDs cannot be provided, it becomes difficult if not impossible to make the LCD products lighter and slimmer.

SUMMARY

Aspects of the present disclosure include providing a backlight assembly with improved heat dissipation performance and simplified structure.

However, the present disclosure is not restricted to embodiments set forth herein. The above and various other aspects of the present disclosure will become more readily apparent to ones of ordinary skill in the art to which the present disclosure pertains by referencing the detailed description given below.

According to an aspect of the present disclosure, there is provided a backlight assembly including: a light sourcing unit which utilizes point light sources such as LEDs to emit light.

A light-sourcing unit fixing frame is provided to support the light sourcing unit and also to thermally conduct heat energy away from the light sourcing unit. The light sourcing unit and light-sourcing unit fixing frame are housed in an inside portion of a housing. The housing has a plate-like bottom portion through which an opening is defined to communicate between the inside portion and an outside portion of the housing. The light-sourcing unit fixing frame has a lateral extension portion which extends through the opening from the inside portion toward the outside portion of the housing to thereby be exposed to regions outside the housing for better dissipating heat energy to outside of the housing. In one embodiment, the light-sourcing unit fixing frame mechanically interlocks with housing by way of various matings of protrusions and grooves.

BRIEF DESCRIPTION OF THE DRAWINGS

The above and other aspects and features of the present teachings will become more apparent by describing in detail exemplary embodiments in accordance with them and with reference to the attached drawings, in which.

DETAILED DESCRIPTION

Figure 1:
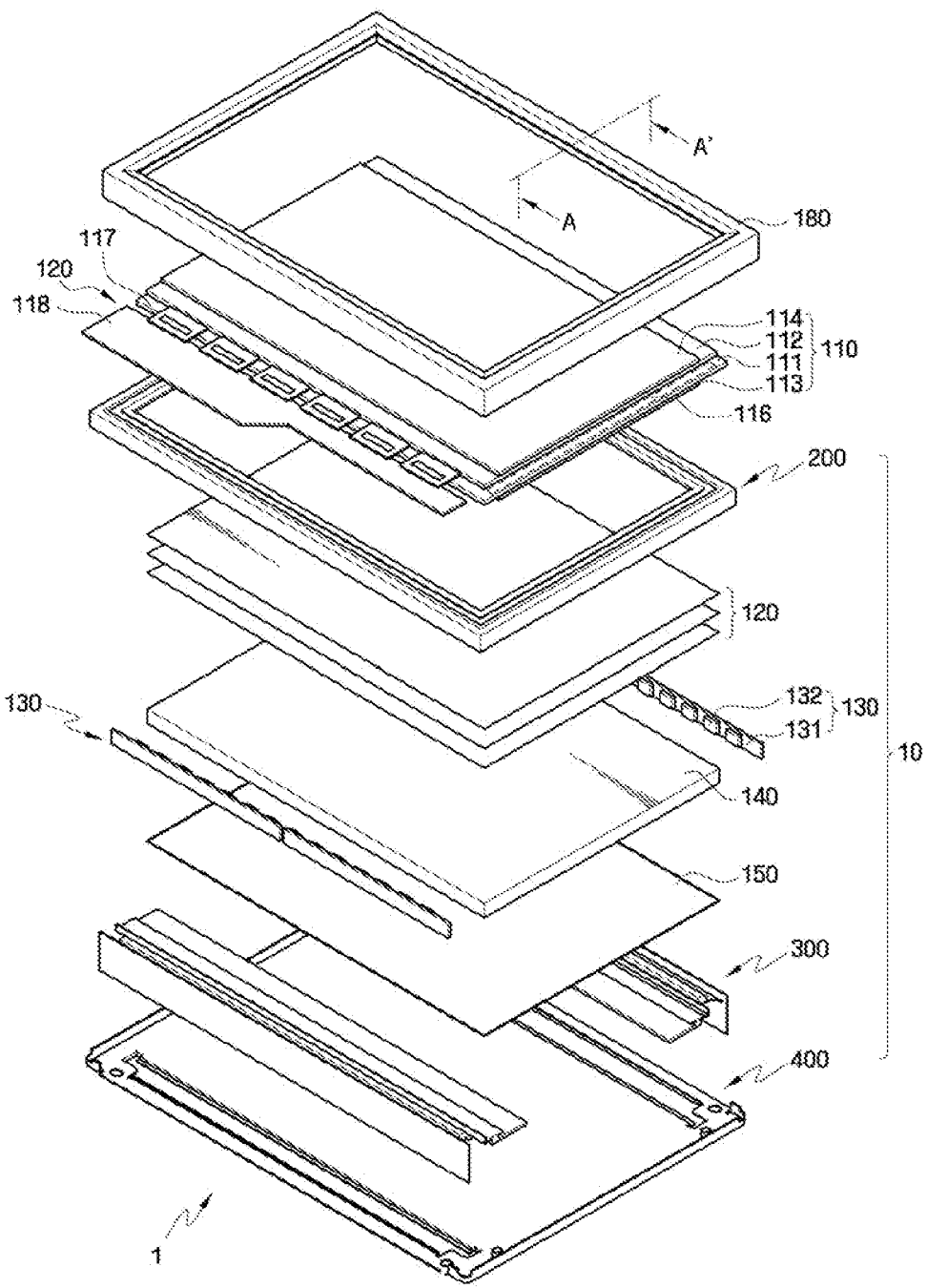
FIG. 1 is an exploded perspective view of a display device according to an exemplary embodiment.

Advantages and features of embodiments in accordance with the disclosure and methods of accomplishing the same may be understood more readily by reference to the following detailed description and the accompanying drawings. The present teachings may, however, be embodied in many different forms and should not be construed as being limited to the embodiments set forth herein. Rather, these embodiments are provided so that the present teachings will be thorough and complete and will fully convey the intended concepts to those skilled in the art. In the drawings, sizes and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. Like reference numerals refer to like elements throughout the specification.

Embodiments in accordance with the disclosure are described herein with reference to plan and cross-section illustrations that are schematic illustrations of idealized embodiments. As such, variations from the shapes of the illustrations as a result, for example, of manufacturing techniques and/or tolerances, are to be expected. Thus, the present teachings should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the invention.

Hereinafter, exemplary embodiments will be described in detail with reference to the attached drawings.

Figure 2:
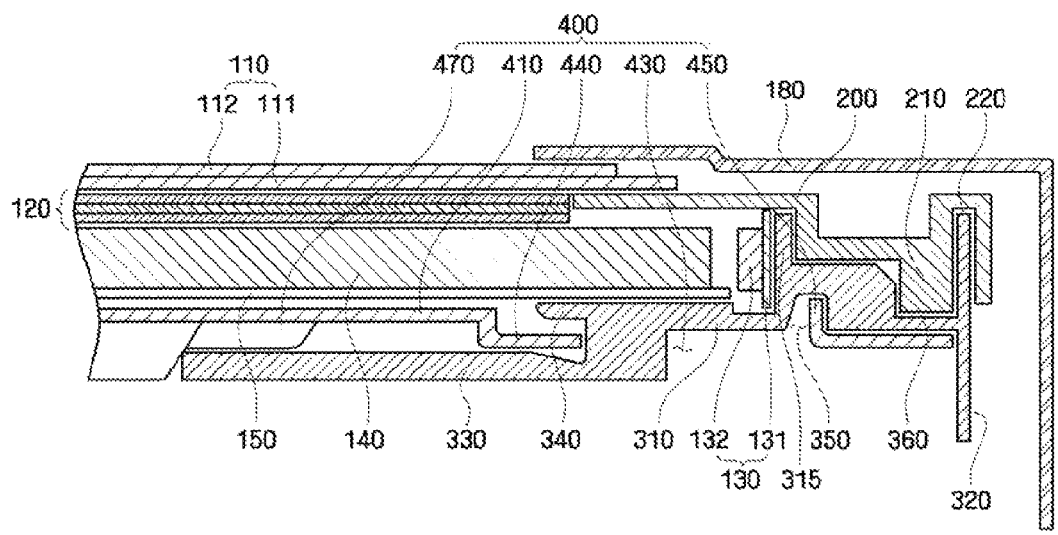
FIG. 2 is a cross-sectional view of the display device taken along the line A-A' of FIG. 1.

Hereinafter, a backlight assembly and a display device according to an exemplary embodiment will be described in detail with reference to FIGS. 1 through 8. FIG. 1 is an exploded perspective view of a display device 1 according to a first exemplary embodiment. FIG. 2 is a cross-sectional view of the display device 1 taken along the line A-A' through an assembled (not exploded) version of the device of FIG. 1.

Referring to FIGS. 1 and 2, the display device 1 includes a multi-layer display panel assembly 110 which displays images and a backlight assembly 10 which provides light to the display panel assembly 110.

The display panel assembly 110 receives light from the backlight assembly 10 and displays an image accordingly. The display panel assembly 110 can have any of various flat panel structures (e.g., Liquid Crystal Display (LCD) structure) as long as it can receive light from the backlight assembly 10 and display an image accordingly. In this specification, a liquid crystal display panel will be described as an example. However, the present disclosure of invention is not limited to liquid crystal display panels.

The display panel assembly 110 includes first and second spaced apart substrates 111 and 112 between which a liquid crystals material layer (not explicitly shown) is disposed, one or more integrated gate lines driving integrated circuits (ICs) 116, one or more flexible printed circuit films 117 (optionally with a data line driver ICs on each), and a printed circuit board (PCB) 118 coupled to the flexible printed circuit films 117.

The display panel 110 may further include a set of polarizers 113 and 114 which are respectively disposed on surfaces of the first and second substrates 111 and 112. Although not shown, the first or lower substrate 111 typically includes a plurality of gate lines (not shown), data lines (not shown) and pixel electrodes, while the second or upper substrate 112 typically includes a black matrix, color filters, and a common electrode. One or both of the color filters and the common electrode may alternatively be formed on the first substrate 111, depending on the type of the display panel technology being used.

The display panel 110 formed by stacking the above flat plate-shaped substrates or layers is placed on or within an intermediate frame 200 which will be described later.

The backlight assembly 10 includes one or more light sourcing units 130, a light guide plate (LGP) 140, one or more optical sheets 120, a reflective sheet 150, a lower housing 400, and one or more light-sourcing unit fixing frames 300. The backlight assembly 10 may also be contained within the intermediate frame 200 along with the display panel 110.

Each of the light sourcing units 130 may include a plurality of point light sources 132 (e.g., LEDs) mounted on a supporting circuit board 131. The light sourcing units 130 may be disposed adjacent to respective side surfaces of the LGP 140 so as to provide edge lighting. The point light sources 132 may be, for example, white light emitting LEDs. The light sourcing units 130 may be disposed along just one side surface of the LGP 140 or adjacent to plural side surfaces depending on the design of the LGP 140. That is, the light sourcing units 130 may be disposed along one side surface or along an opposed two of the side surfaces, or along all four side surfaces of the LGP 140 in view of the size, luminance uniformity, or the like needs of the display panel 110.

For rapid heat dissipation, the light sourcing units 130 may be respectively attached to corresponding light-sourcing unit fixing frames 300, where the latter are operatively coupled to the lower housing 400. Specifically, the circuit board 131 of each of the light sourcing units 130 may be adhered to one of the light-sourcing unit fixing frames 300 by a thermally conductive adhesive tape such that heat generated by the light sourcing units 130 can be rapidly delivered to the light-sourcing unit fixing frames 300 and dissipated thereby. Here, the adhesive tape may be interposed between the circuit board 131 of each of the light sources 130 and one of the light-sourcing unit fixing frames 300 and have superior thermal conductivity. The light sourcing units 130 may be fixed to the light-sourcing unit fixing frames 300 not only by the adhesive tape but also by screws, hooks, or other types of fasteners, preferably fasteners with good heat conduction characteristics.

The LGP 140 redirects light received from the edge mounted light sourcing units 130 to the overlying display panel 110 and optionally redistributes the redirected light so as to provide uniform lighting. The optic plates or films 120 above the LGP may provide further optical processing of the redirected light. As mentioned, the LGP 140 and its side-adjacent light sourcing units 130 are housed in the lower housing 400. The LGP 140 may have a same shape and similar dimensioning as the display panel 110, that is, it may be shaped like a rectangular plate. However, the shape of the LGP 140 is not limited to the shape of a rectangular plate. When the point light sources 132 are LEDs, the LGP 140 may be formed as various patterns, which includes predetermined grooves or protrusions according to the positions of the point light sources 132 and the desired redirection of light rays emitted from the point light sources 132.

For ease of description, it is assumed that the LGP 140 is plate-shaped. However, the LGP 140 may also be formed as a sheet or a film in order to make the display device 1 slimmer. That is, the LGP 140 can be any one of a plate and a film that can guide light.

To efficiently guide its received edge lights, the LGP 140 may be made of a light-transmitting material, for example, acrylic resin (such as polymethyl methacrylate (PMMA)) or polycarbonate (PC).

A pattern may be formed on at least one surface of the LGP 140. For example, a diffusion pattern (not shown) may be formed on a lower surface of the LGP 140 such that guided light can come out of the LGP 140 in an upward direction.

The optical sheets 120 disposed on an upper surface of the LGP 140 may further diffuse and concentrate redirected light that is received from the LGP 140. The optical sheets 120 may include a diffusion sheet, a prism sheet, and a protective sheet. The diffusion sheet may diffuse light, which is received from the LGP 140, and thus prevent the light from being concentrated in a specific area. The prism sheet may have a predetermined array of triangular prisms on a surface thereof. The prism sheet may be disposed on the diffusion sheet and concentrate light, which is diffused by the diffusion sheet, in a direction perpendicular to the liquid crystal panel 110. The protective sheet may be disposed on the prism sheet and protect a surface of the prism sheet. In addition, the protective sheet may diffuse light for more uniform distribution of the light.

The intermediate frame 200 is coupled to the lower housing 400, thereby accommodating the optical sheets 120, the LGP 140, the light sourcing units 130, the reflective sheet 150, and the light-sourcing unit fixing frames 300 therebetween. The intermediate frame 200 is formed to fit along protruding edges (e.g., 450) of the lower housing 400 and includes an open window in the center thereof to expose the optical sheets 120 and let light through.

The display panel 110 is placed on top of a laterally extending portion of the intermediate frame 200 as better seen in FIG. 2. The intermediate frame 200 may be made of a flexible material, such as a plastic material, in order to prevent the display panel 110 from being damaged.

The reflective sheet 150 is disposed between the LGP 140 and the lower housing 400 and reflects light which is output downward from the lower surface of the LGP 140 so that the reflected light is redirected toward the display panel 110, thereby improving light usage efficiency.

To be reflective, the reflective sheet 150 may be made of, e.g., polyethylene terephthalate (PET). In addition, a diffusion layer containing, e.g., titanium dioxide, may be coated on a surface of the reflective sheet 150. The reflective sheet 150 may also include a reflective metal such as silver (Ag).

The lower housing 400 may be made of a metal material having the same rigidity as stainless steel or a material having good heat dissipation properties such as aluminum or an aluminum alloy. The lower housing 400 according to the current exemplary embodiment helps to maintain the framework of the display device 1 and protects various components housed therein.

Each of the light-sourcing unit fixing frames 300 is disposed on a side of the lower housing 400 and is structured to rapidly dissipate heat, which heat is generated by the respective one of the light sourcing units 130. Each light-sourcing unit fixing frame 300 dissipates the heat it sinks from its respective light sourcing unit(s) 130 out of the lower housing 400. In addition to this heat dissipation function, the light-sourcing unit fixing frames 300 may have the additional function of helping to maintain the framework of the display device 1 by being coupled to and operatively cooperating with the lower housing 400.

At least part of each of the light-sourcing unit fixing frames 300 is extended (e.g., 320) so as to be exposed through an underside of the lower housing 400. Accordingly, the light-sourcing unit fixing frames 300 can rapidly dissipate heat to an ambient on the underside of the lower housing 400, which heat is received from the light sourcing units 130. Thus the heat can be rapidly dissipated out of the display device 1 (more specifically, out of the underside of the lower housing 400).

The specific shapes of the lower housing 400, the intermediate frame 200 and the light-sourcing unit fixing frames 300 and the coupling relationships between them will be described in detail later with reference to the attached drawings.

An upper housing 180 is coupled to the intermediate frame 200 and the lower housing 400 to cover the display panel 110 which is placed on the intermediate frame 200. An open window is formed in the center of the upper housing 180 to expose the display panel 110 so that users can view its displayed images.

The upper housing 180 may be coupled to the intermediate frame 200 and the lower housing 400 by hooks and/or screws or other appropriate fastening means. The upper housing 180 may also be coupled to the lower housing 400 using various methods other than the above methods.

Figure 3:
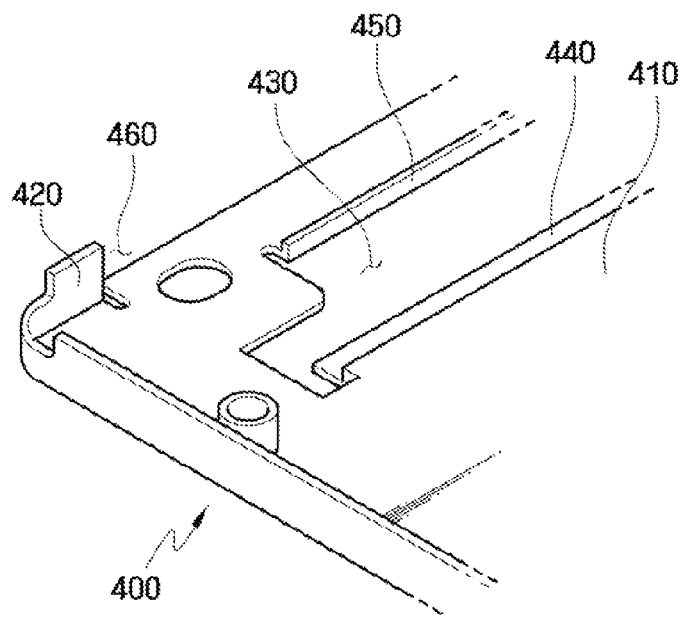
FIG. 3 is a partial perspective view of a lower housing included in the display device of FIG. 1.
Figure 4:
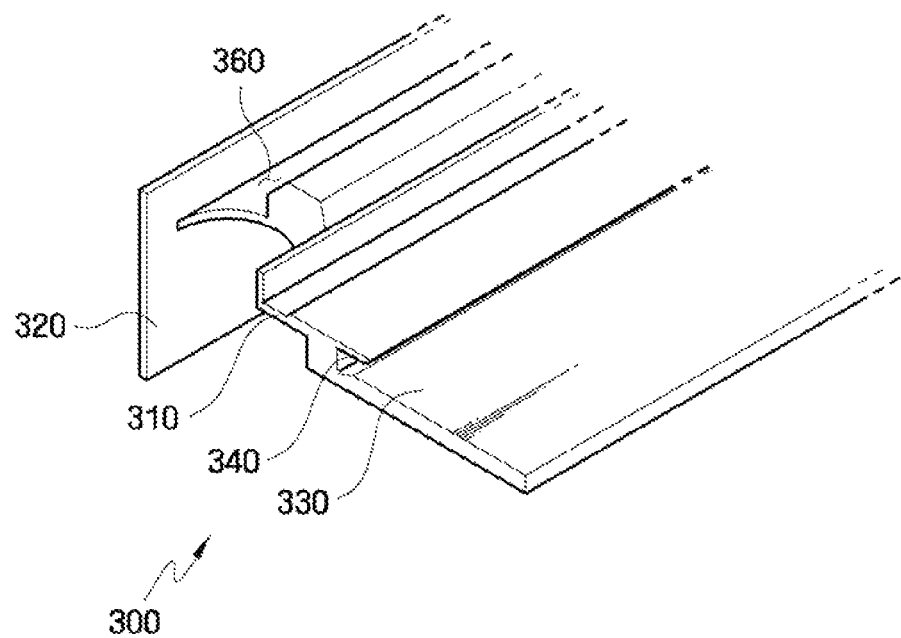
FIG. 4 is a partial perspective view of a light-sourcing unit fixing frame included in the display device of FIG. 1.
Figure 5:
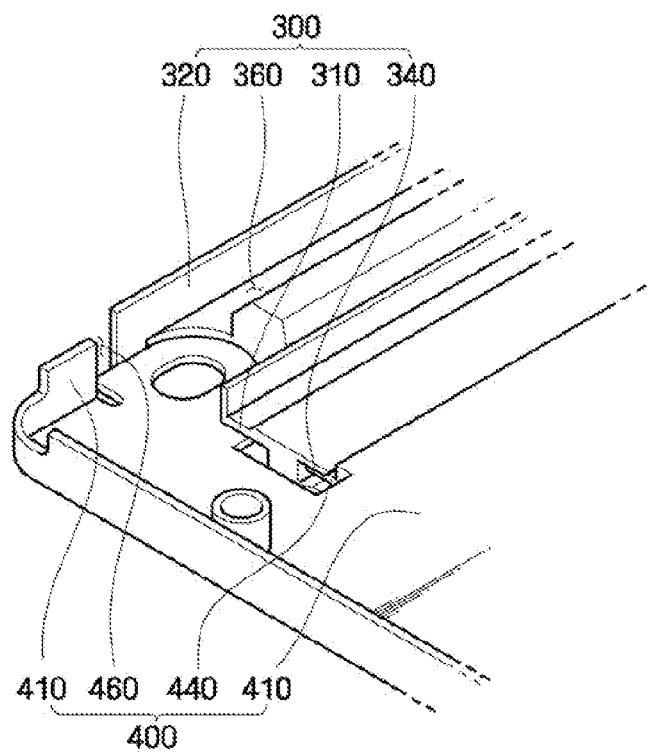
FIG. 5 is a partial perspective view showing the lower housing of FIG. 3 and the fixing frame of FIG. 4 which are coupled to each other.
Figure 6:
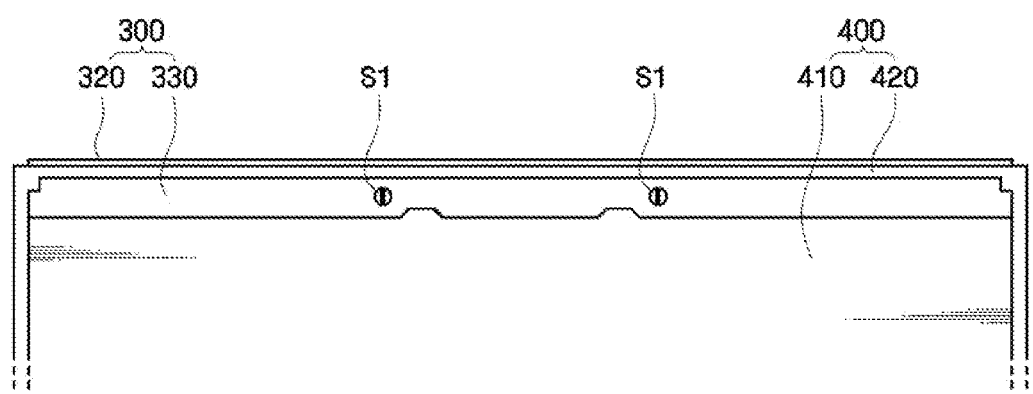
FIG. 6 is a partial plan view showing the lower housing of FIG. 3 and the fixing frame of FIG. 4 which are coupled to each other.

Hereinafter, specific structures of the lower housing 400 and the light-sourcing unit fixing frames 300 will be described in detail with reference to FIGS. 2 through 6. FIG. 3 is a partial perspective view of the lower housing 400 included in the display device 1 of FIG. 1. FIG. 4 is a partial perspective view of one of the light-sourcing unit fixing frames 300 included in the display device 1 of FIG. 1. FIG. 5 is a partial perspective view showing an assembly in which the lower housing 400 of FIG. 3 and the light-sourcing unit fixing frame 300 of FIG. 4 are coupled to each other. FIG. 6 is a partial plan view showing the lower housing 400 of FIG. 3 and the light-sourcing unit fixing frame 300 of FIG. 4 which are coupled to each other.

Referring to FIGS. 2 and 3, the lower housing 400 includes a plate-like bottom portion 410 and sidewall portions 420 that extend from the periphery of the bottom portion 410 to at least partially surround the bottom portion 410.

The lower housing 400 accommodates the LGP 140, the light sourcing units 130, etc. and maintains the rigidity of the display device 1. The bottom portion 410 and the sidewall portions 420 may be selectively formed. That is, when the display device 1 maintains sufficient rigidity, some or all of the bottom portion 410 and the sidewall portions 420 may be omitted. For example, when the intermediate frame 200 or the upper housing 180, which is coupled to the lower housing 400, enables the display device 1 to maintain sufficient rigidity, only the bottom portion 410 may be included in the lower housing 400 without the sidewalls 420.

The lower housing 400 has first aperture portions 430 and second sidewall opening portions 460 defined therethrough, thereby allowing corresponding parts of each of the light-sourcing unit fixing frames 300 to be exposed outside the lower housing 400. As shown in FIG. 2, an exposed portion of each of the light-sourcing unit fixing frames 300 may be covered by the upper housing 180 or may be hidden by a case of the display device 1, so that it cannot be seen from the outside. Each of the first aperture portions 430 may be formed by cutting open at least part of the bottom portion 410, and each of the second aperture portions (sidewall openings) 430 may be formed by cutting open at least part of one of the sidewall portions 420. Specifically, the first aperture portions 430 are formed by perforating some regions of the bottom plate portion 410, and borders of each of the first aperture portions 430 are connected to each other, thereby forming a closed space. On the other hand, each of the second aperture portions (sidewall openings) 460 is formed by removing part of one of the sidewall portions 420, and all borders of each of the second aperture portions 460 are not connected to each other, thereby forming an open space.

The positions and shapes of the first aperture portions 430 and the second aperture portions 460 are not limited to the above examples. The shapes of the first aperture portions 430 and the second aperture portions (sidewall openings) 460 may vary as desired.

The first aperture portions 430 may extend a long distance along a direction in which the light sourcing units 130 and longer ones of the sidewall portions 420 extend. In addition, each of the first aperture portions 430 may be rectangular and may be divided into a plurality of sections.

The lower housing 400 may include a bent portion on at least one side of each of the first aperture portions 430, so that each of the light-sourcing unit fixing frames 300 can be coupled to the bent portion. Specifically, the lower housing 400 includes a first bent portion 440 which is formed on an underside of each of the first aperture portions 430 and a second bent portion 450 which is formed to protrude from the other side (top side) of each of the first aperture portions 430.

The first bent portion 440 and the second bent portion 450 may fix each of the light-sourcing unit fixing frames 300 to the bottom portion 410 in vertical and horizontal directions with respect to the bottom portion 410, respectively so that the light-sourcing unit fixing frame 300 cannot easily move in the vertical and horizontal directions once attached.

The first bent portion 440 may be formed by bending an extended cut-out portion of the bottom portion 410 which is adjacent to each of the first aperture portions 430. A cross section of the first bent portion 440 may be 'L'-shaped. The first bent portion 440 may extend parallel to the bottom plate portion 410 and may be inserted between an extension portion 330 and a fixing protrusion 340 (which will be described later) of each of the light-sourcing unit fixing frames 300. The first bent portion 440 may be continuously formed along an adjacent portion of each of the light-sourcing unit fixing frames 300 or may be discontinuously formed along the adjacent portion of each of the light-sourcing unit fixing frames 300.

The second bent portion 450 may be formed by bending upwardly an extended cut-out portion of the bottom portion 410 which is adjacent to each of the first aperture portions 430. The second bent portion 450 may be bent to be perpendicular to the bottom portion 410, and a cross section of the second bent portion 450 may be 'L'-shaped. That is, the second bent portion 450 protrudes upwardly from the bottom portion 410 in a direction perpendicular to the bottom portion 410 and is inserted into a first fixing groove 350 (which will be described later) of each of the light-sourcing unit fixing frames 300. The second bent portion 450 may be continuously formed along an adjacent portion of each of the light-sourcing unit fixing frames 300 or may be discontinuously formed along the adjacent portion of each of the light-sourcing unit fixing frames 300.

Each of the second aperture portions (sidewall openings) 460 may be formed by cutting at least part of one of the sidewall portions 420. Accordingly, an end of each of the light-sourcing unit fixing frames 300 may be exposed through one of the second aperture portions 460. Each of the second aperture portions 460 may not necessarily be formed by cutting part of one of the sidewall portions 420. The second aperture portions 460 may also be formed by removing all of the sidewall portions 420. That is, each of the second aperture portions 460 can have any shape as long as it is formed by cutting at least part of one of the sidewall portions 420 to expose one of the light-sourcing unit fixing frames.

Referring to FIGS. 2 and 4, each of the light-sourcing unit fixing frames 300 includes a horizontal portion 310, which is disposed inside the lower housing 400, and the lateral extension portion 330 and a vertical extension portion 320 which are exposed outside the lower housing 400.

The horizontal portion 310 is disposed parallel to the bottom portion 410 of the lower housing 400. The vertical portion 320 and the lateral extension portion 330 are connected to both ends of the horizontal portion 310. The vertical portion 320 extends from an end of the horizontal portion 310 in a direction perpendicular to the horizontal portion 310 and is exposed outside the lower housing 40 through each of the second aperture portions (sidewall openings) 460. In the horizontal portion 310 and the vertical portion 320, the terms 'horizontal' and 'vertical' are used for ease of description and do not indicate that the horizontal portion 310 and the vertical portion 320 must be perpendicular to each other. The vertical portion 320 can have any shape as long as it can extend from the horizontal portion 310 and can be exposed through each of the second aperture portions 460.

The vertical portion 320 may be formed parallel to the sidewall portions 420 of the lower housing 400. The vertical portion 320 may extend to a position lower than the bottom portion 410 of the lower housing 400. The area of the vertical portion 320 may be adjusted in view of heat dissipation effect.

The lateral extension portion 330 extends from an end of the horizontal portion 310 of each of the light-sourcing unit fixing frames 300 in a direction parallel to the bottom portion 410. The lateral extension portion 330 is exposed outside the lower housing through each of the first aperture portions 430 and overlaps at least part of the bottom portion 410 in spaced apart relation.

The lateral extension portion 330 overlaps the bottom portion 410 such that each of the light-sourcing unit fixing frames 330 can be supported by and fixed to the lower housing 400. Methods of fixing the light-sourcing unit fixing frames 300 to the lower housing 400 will be described in detail later.

The fixing protrusion 340 is formed at an end of the horizontal portion 310 and extends parallel to the lateral extension portion 330. The fixing protrusion 340 fixes each of the light-sourcing unit fixing frames 330 to the lower housing 400. The first bent portion (lateral extension) 440 of the lower housing 400 is inserted between the fixing protrusion 340 and the extension portion 330.

The fixing protrusion 340 is separated from the extension portion 330 such that the first bent portion 440 of the lower housing 400 can be inserted between the fixing protrusion 340 and the lateral extension portion 330 of the corresponding light-sourcing unit fixing frame 300. The fixing protrusion 340 may be continuously or discontinuously formed along the extension portion 330.

Each of the light-sourcing unit fixing frames 300 includes the first fixing groove 350 and a second fixing groove 360 into which the second bent portion 450 of the lower housing 400 and a protrusion portion 210 of the intermediate frame 200 are inserted, respectively.

The first fixing groove 350 may be formed such that the second bent portion 450 of the lower housing 400 can be inserted thereinto. The first fixing groove 350 may be cut into each of the light-sourcing unit fixing frames 300 in a direction parallel to the vertical portion 320 and may be fixed to the second bent portion 450 in a direction horizontal to the bottom portion 410.

The second fixing groove 360 may be formed such that the protrusion portion 210 of the intermediate frame 200 can be inserted thereinto. The first and second fixing grooves 350 and 360 may be continuously or discontinuously formed along one or more of the sidewall portions 420 of the lower housing 400. The sizes and positions of the first and second fixing grooves 350 and 360 may vary as desired.

The light-sourcing unit fixing frames 300 may be made of metal having superior thermal conductivity, such as aluminum or an alloy thereof. In addition, the light-sourcing unit fixing frames 300 may be manufactured using various methods such as extrusion and plate work.

The inter-coupling structure between the lower housing 400 and the light-sourcing unit fixing frames 300 will now be described in detail with reference to FIGS. 2, 5 and 6.

Each of the light-sourcing unit fixing frames 300 is fixed to an end of the lower housing 400. Here, the extension portion 330 and the vertical portion 320 of each of the light-sourcing unit fixing frames 300 are exposed outside the lower housing 400 respectively through one of the first aperture portions 430 and one of the second aperture portions 460.

In particular, the lateral extension portion 330 is inserted so as to protrude outside the underside of the lower housing 400 after having been angle-wise placed through each of the first aperture portions 430 and tilted flat to overlap at least part of the bottom portion 410. The first bent portion 440 of the lower housing 400 is inserted between the extension portion 330 and the fixing protrusion 340 which extends parallel to the extension portion 330. Accordingly, the light-sourcing unit fixing frames 300 are fixed to the lower housing 400 in a direction perpendicular to the lower housing 400. Here, each of the first aperture portions 430 may expose part of the horizontal portion 310 of each of the light-sourcing unit fixing frames 300.

The second bent portion 450 of the lower housing 400 is inserted into the first fixing groove 350 of each of the light-sourcing unit fixing frames 300, thereby fixing each of the light-sourcing unit fixing frames 300 to the lower housing 400 in the direction perpendicular to the lower housing 400.

The vertical portion 320 of each of the light-sourcing unit fixing frames 300 is exposed outside the lower housing through one of the second aperture portions 460 and extends to a position lower than the bottom portion 410 in order to strengthen the horizontal coupling between each of the light-sourcing unit fixing frames 300 and the lower housing 400.

An upper end of the protruding vertical portion 320 of each of the light-sourcing unit fixing frames 300 may be at the same height as or may be lower than that of a fixing wall 315 of each of the light-sourcing unit fixing frames 300 which supports the light sources printed circuit board 131. Accordingly, even when the light-sourcing unit fixing frames 300 are exposed outside the lower housing 400, the thickness of the entire module does not increase.

The light-sourcing unit fixing frames 300 may be coupled to the lower housing 400 by screws. Specifically, the extension portion 330 of each of the light-sourcing unit fixing frames 300 may be coupled to the bottom portion 410 of the lower housing 40 by screws S1.

However, the light-sourcing unit fixing frames 300 are not necessarily coupled to the lower housing 400 by screws. That is, the light-sourcing unit fixing frames 300 may also be coupled to the lower housing 400 by welding or caulking or other appropriate fastening techniques and means.

Figure 7:
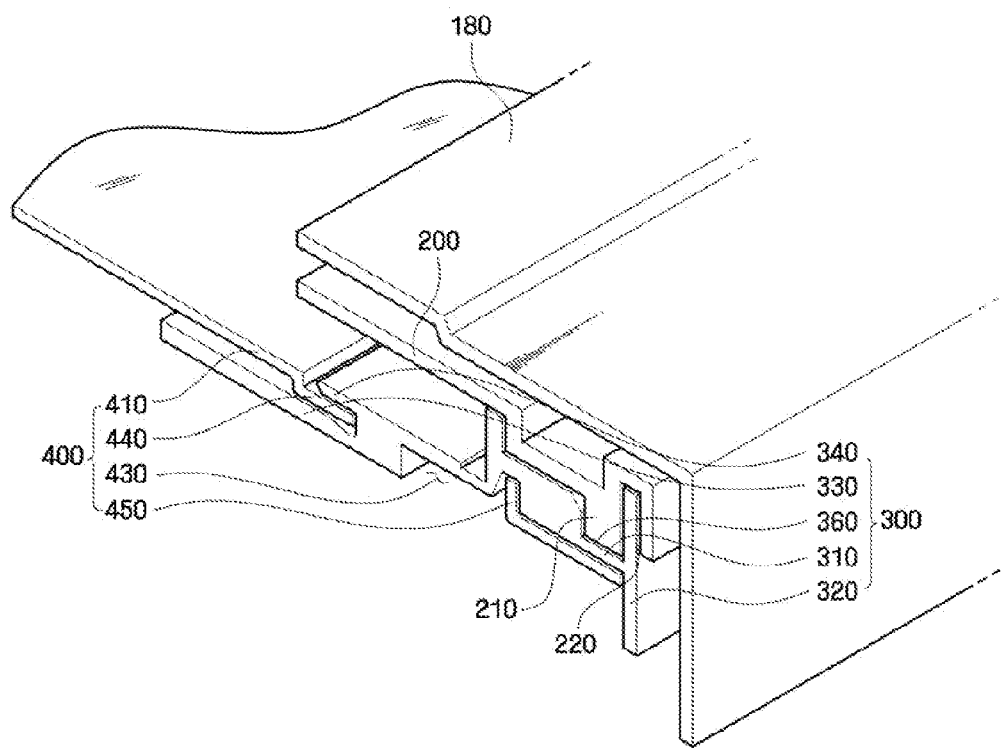
FIG. 7 is a partially cut perspective view of the lower housing, an intermediate frame, the LED-fixing frame, and an upper housing included in the display device of FIG. 1.
Figure 8:
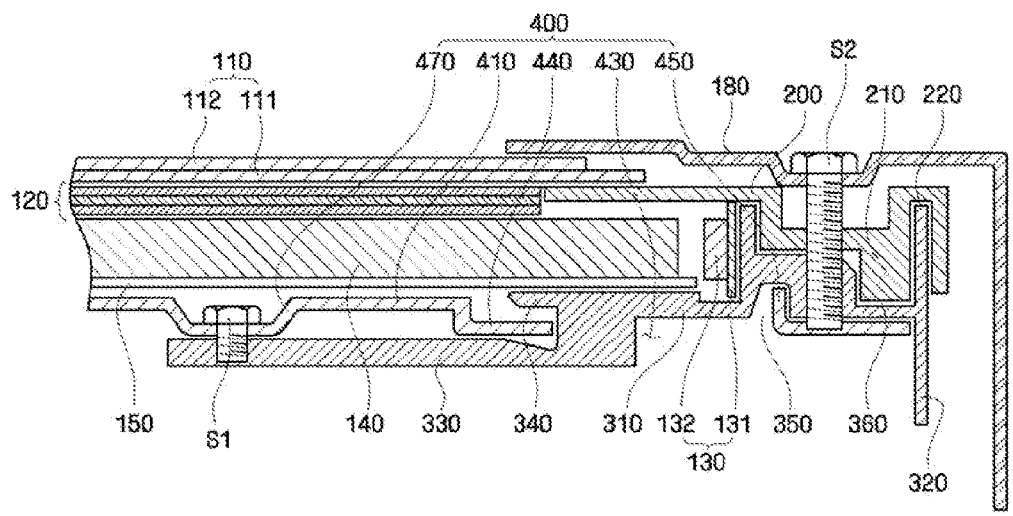
FIG. 8 is a cross-sectional view for explaining a method of coupling components of the display device of FIG. 1 to each other.

The inter-coupling relationships between the upper housing 180, the intermediate frame 200, the lower housing 400, and the light-sourcing unit fixing frames 300 will now be described in detail with reference to FIGS. 7 and 8. FIG. 7 is a partially cut perspective view of the lower housing 400, the intermediate frame 200, the light-sourcing unit fixing frames 300, and the upper housing 180 included in the display device 1 of FIG. 1. FIG. 8 is a cross-sectional view for explaining a method of inter-coupling components of the display device 1 of FIG. 1 to each other.

Referring to FIGS. 7 and 8, the intermediate frame 200 is coupled onto the lower housing 400 and the light-sourcing unit fixing frames 300. Here, after the light-sourcing unit fixing frame 300 is mated with the corresponding portion of lower housing 400, an end of the intermediate frame 200 is inserted into the second fixing groove 360 of the light-sourcing unit fixing frame 300, and part of the vertical portion 320 of the light-sourcing unit fixing frame 300 mates with insertion groove 220 of the intermediate frame 200. That is, the light-sourcing unit fixing frames 300 and the intermediate frame 200 are inter-coupled to and mated with each other by way of mating protrusions and grooves thereof.

The display panel 110 is placed on the intermediate frame 200, and the upper housing 180 is coupled onto the display panel 110. The upper housing 180 may be coupled to the lower housing 400 by screws S2. The screws S2 sequentially penetrate the upper housing 180, the intermediate frame 200, and the light-sourcing unit fixing frames 300 to be coupled to the lower housing 400.

Figure 9:
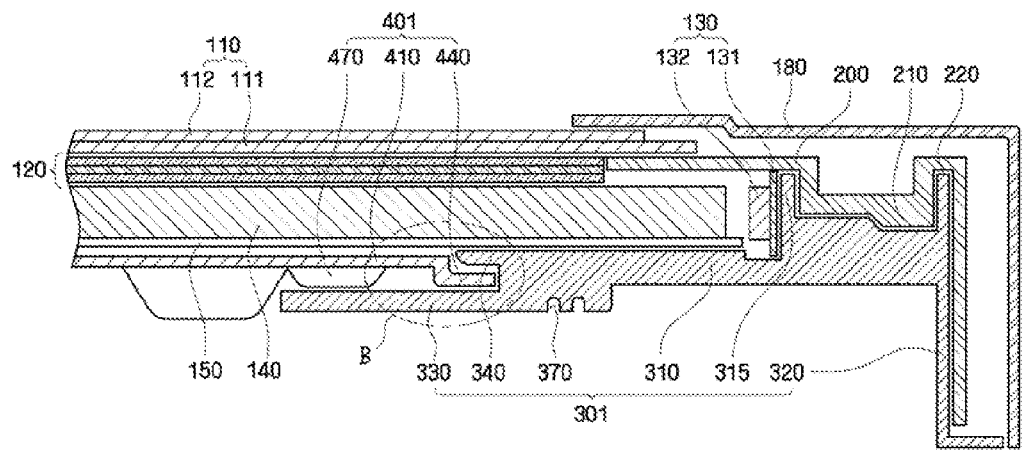
FIG. 9 is a cross-sectional view of a display device according to another exemplary embodiment.

As described above, the lower housing 400 and the light-sourcing unit fixing frames 300 are coupled to each other by the screws S1. Each of the screws S1 may be inserted into a protrusion portion 470 in a direction from inside the protrusion portion 470. The protrusion portion 470 is formed by protruding a portion of the bottom portion 410 outwards from the bottom portion 410. The lower housing 400 may be pre-threaded to receive screws S2. The light-sourcing unit fixing frame 300 may be pre-threaded to receive screws S1. Alternatively, the screws may be sheet metal screws that self thread into at least the lowest one of the sequential layers Hereinafter, a backlight assembly and a display device according to another exemplary embodiment will be described in detail with reference to FIGS. 9 through 15. FIG. 9 is a cross-sectional view of a display device according to another exemplary embodiment.

In the backlight assembly and the display device according to the current exemplary embodiment, a horizontal portion (330') and a vertical portion (320') of each light-sourcing unit fixing frame are completely exposed at the underside of the lower housing to the outside ambient. That is, a sidewall portion is completely removed from a side of the lower housing to which each light-sourcing unit fixing frame is coupled. Elements substantially identical to those of the previous exemplary embodiment are indicated by like reference numerals, and thus their description will be omitted.

Figure 10:
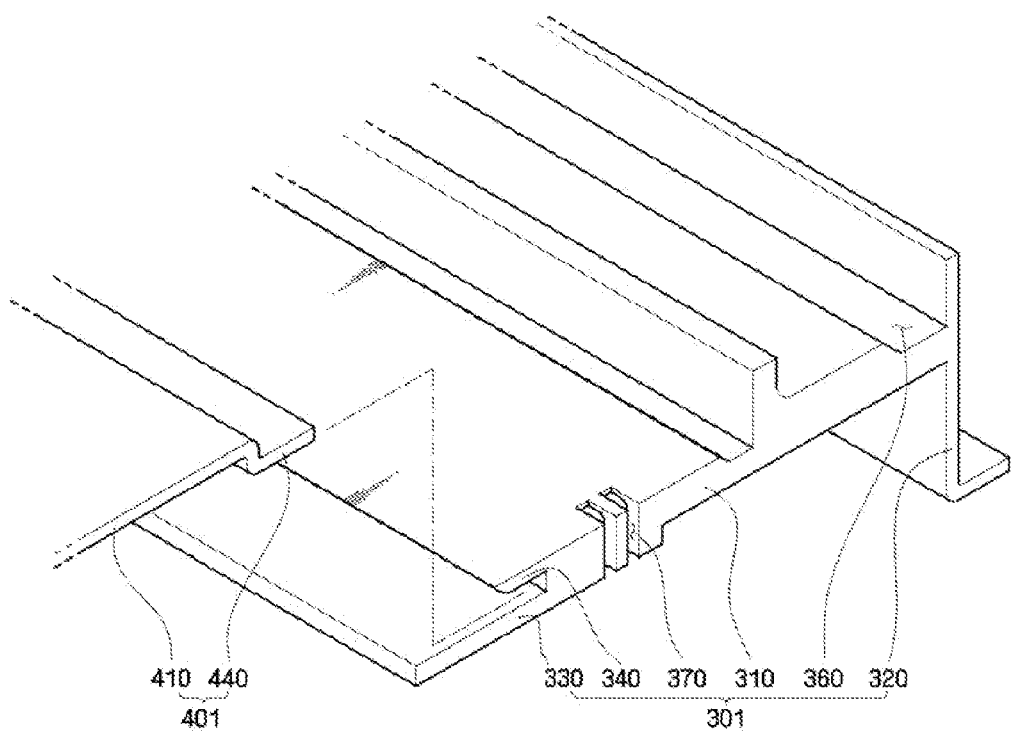
FIG. 10 is a partial perspective view of a lower housing and a fixing frame included in the display device of FIG. 9.
Figure 11:
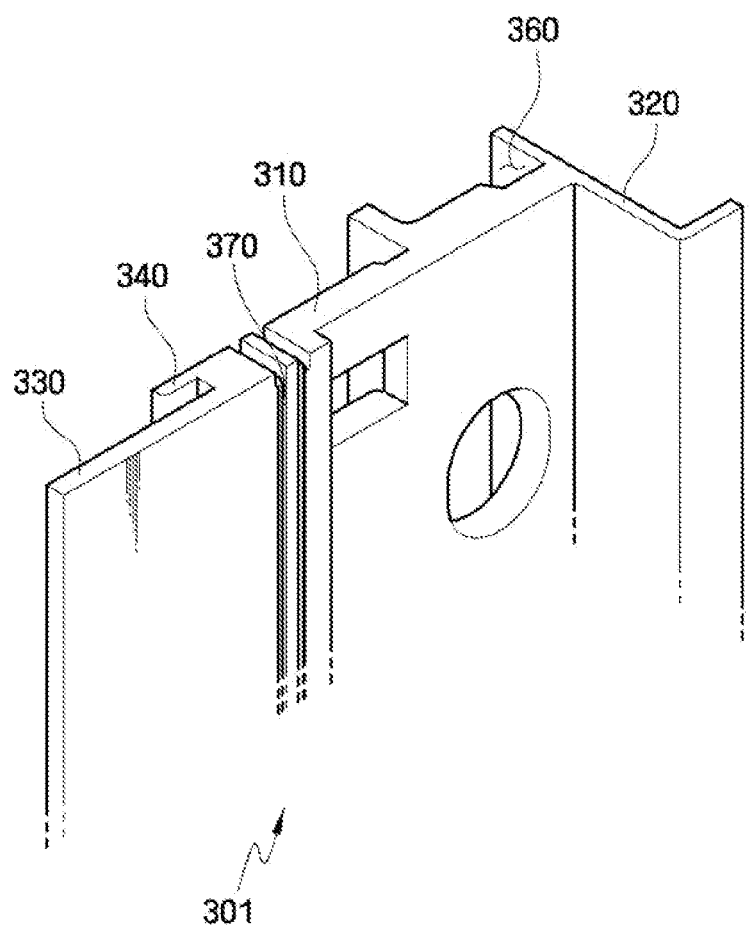
FIG. 11 is a partial perspective view of the fixing frame included in the display device of FIG. 9.

As described above, FIG. 9 is a cross-sectional view of a display device according to another exemplary embodiment. FIG. 10 is a partial perspective view of a lower housing 401 and one of light-sourcing unit fixing frames 301 included in the display device of FIG. 9. FIG. 11 is a partial perspective view of one of the light-sourcing unit fixing frames 301 included in the display device of FIG. 9.

The lower housing 401 includes a bottom portion 410 and a first bent portion 440. The first bent portion 440 may be formed by bending an end of the lower housing 401. Specifically, the first bent portion 440 may be formed at a tip end of the lower housing 401. (There is no section 450 in this embodiment.) That is, the first bent portion 440 may be formed at a tip end of the lower housing 401, and each of the light-sourcing unit fixing frames 301 may be coupled to the lower housing 401. Accordingly, each of the light-sourcing unit fixing frames 301 may be completely exposed outside the lower housing 401, excluding a fixing protrusion 340 thereof.

Since the light-sourcing unit fixing frames 301 completely exposed outside the lower housing 401, heat dissipation effect can be maximized.

A vertical portion 320 of each of the light-sourcing unit fixing frames 301 may serve as a sidewall of the lower housing 401. The lower housing 401 and the light-sourcing unit fixing frames 301 may be formed separately using different materials. Alternatively, the lower housing 401 and the light-sourcing unit fixing frames 301 may be formed simultaneously using the same material. When coupled to each other, the light-sourcing unit fixing frames 301 and the lower housing 401 may form a separable housing.

One or more wiring insertion groove 370 is formed at a side of each of the light-sourcing unit fixing frames 301, and wiring 133 (see FIG. 14) of one of light sourcing units 130 is inserted into the wiring insertion groove 370. The wiring insertion groove 220 may be cut from a side of each of the light-sourcing unit fixing frames 301 and extend in a rear surface of each of the light-sourcing unit fixing frames 301.

The wiring insertion groove 220 may attach the wiring 133, which extends from one of the light sourcing units 130, to each of the light-sourcing unit fixing frames 301 without using an adhesive member. The wiring insertion groove 370 may provide a passage communicating up to a power supply unit (not shown) which supplies power to each of the light sourcing units 130.

The inter-coupling structure between the lower housing 401 and the light-sourcing unit fixing frames 301 will now be described in detail with reference to FIGS. 12 through 15.

Figure 12:
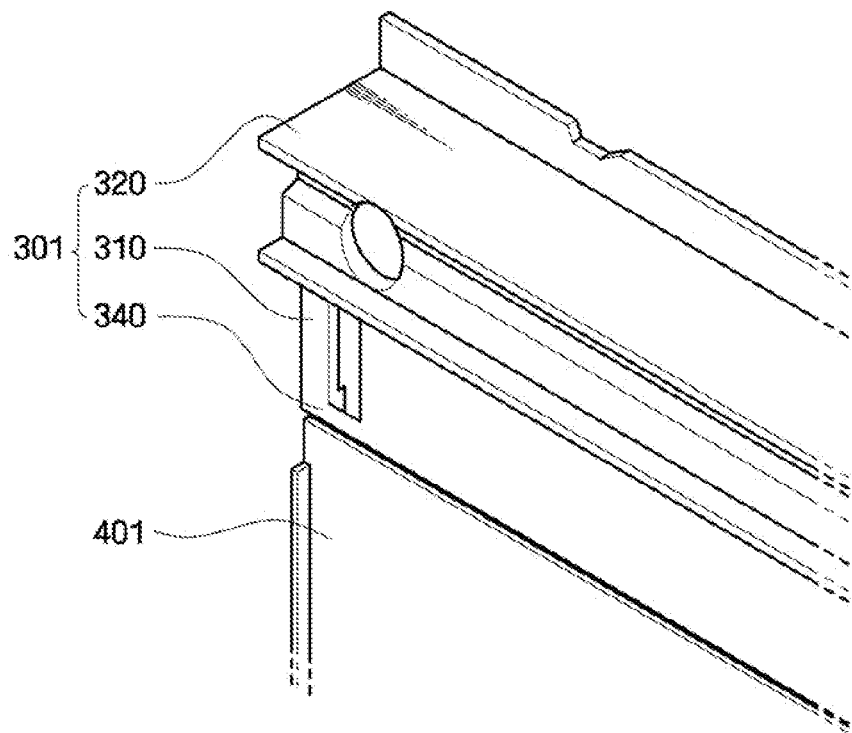
FIG. 12 is a bottom view of the lower housing and the fixing frame included in the display device of FIG. 9.
Figure 13A:
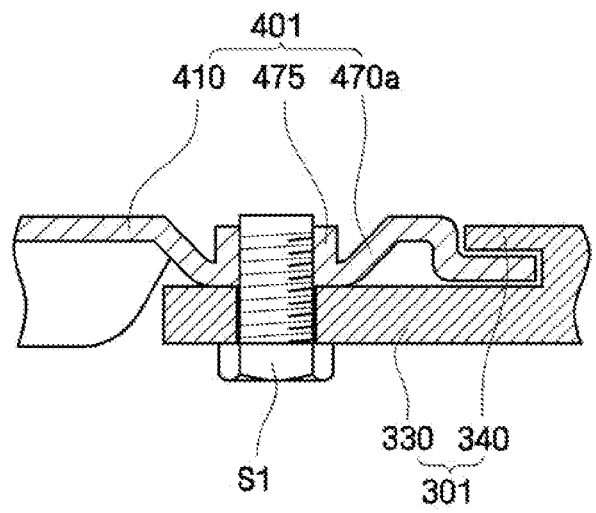
FIGS. 13A and 13B are cross-sectional views for explaining methods of fixing the lower housing and the fixing frame to each other.
Figure 13B:
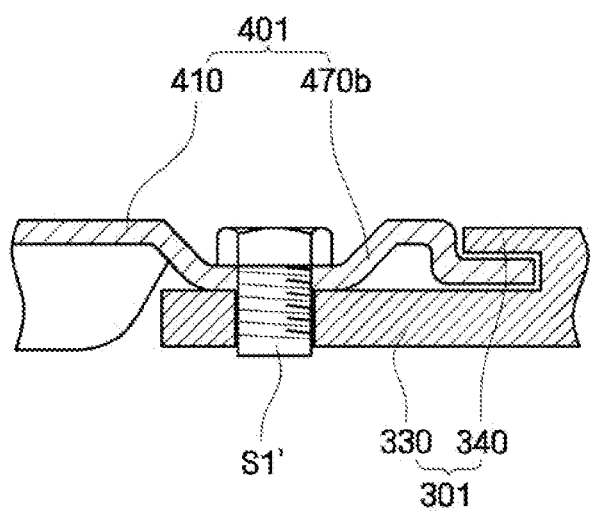
Figure 14:
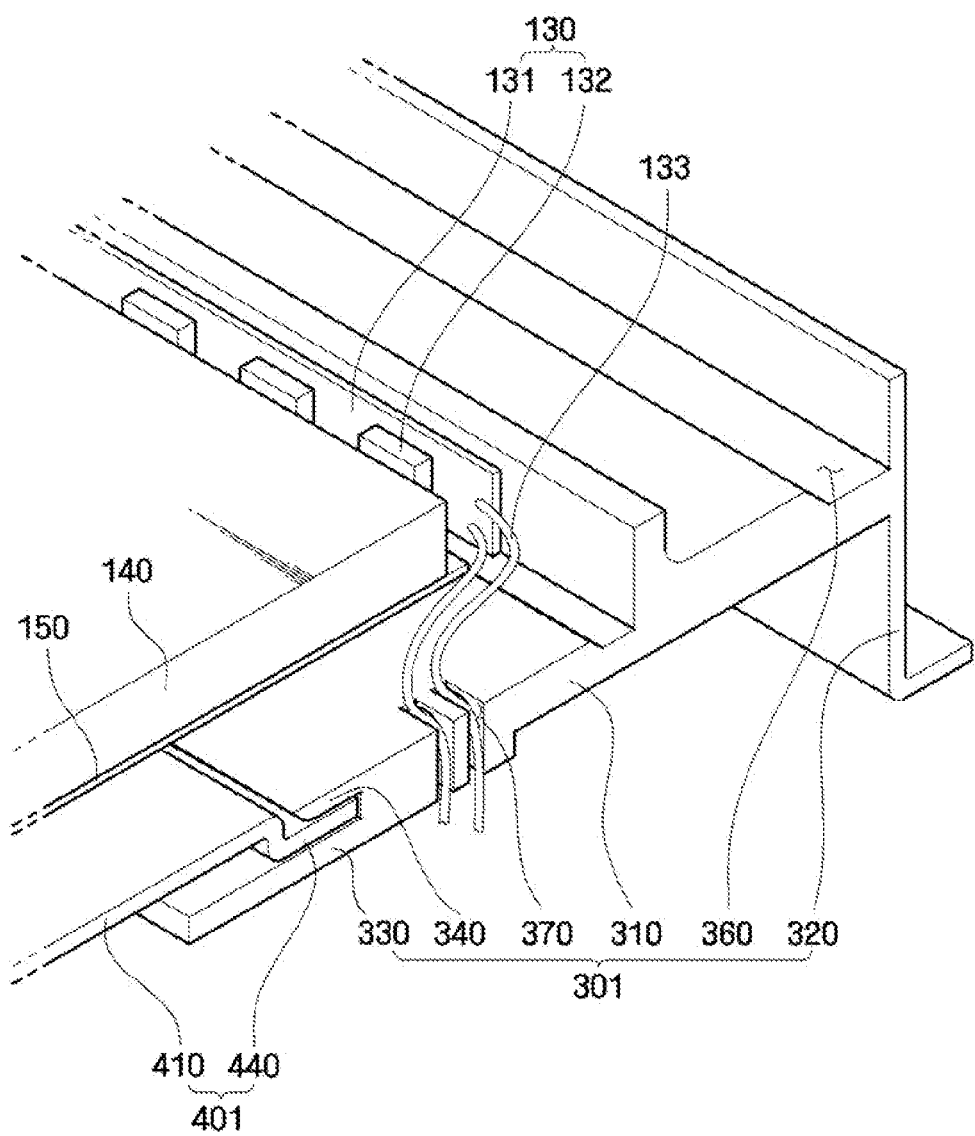
FIG. 14 is a partial perspective view showing the coupling relationships between the lower housing, the LED-fixing frame, and a light sourcing unit included in the display device of FIG. 9.
Figure 15:
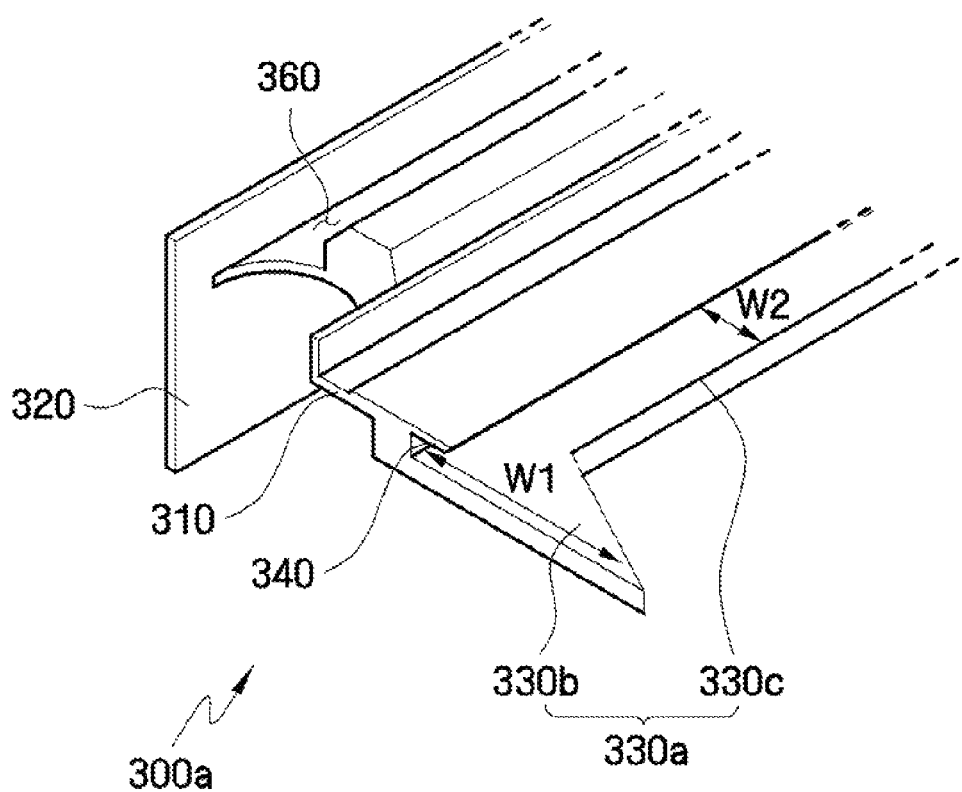
FIG. 15 is a partial bottom view of the display device of FIG. 9.

FIG. 12 is a bottom view of the lower housing 401 and one of the light-sourcing unit fixing frames 301 included in the display device of FIG. 9. FIGS. 13A and 13B are cross-sectional views for explaining possible methods of fixing the lower housing 401 and the light-sourcing unit fixing frames 301 to each other. FIG. 14 is a partial perspective view showing the coupling relationships between the lower housing 401, the light-sourcing unit fixing frames 301, and the light sourcing units 130 included in the display device of FIG. 9. FIG. 15 is a partial bottom view of the display device of FIG. 9.

Each of the light-sourcing unit fixing frames 301 is coupled to a side of the lower housing 401. The light-sourcing unit fixing frames 301 may be coupled to the lower housing 401 by screws.

Various methods may be used to couple the light-sourcing unit fixing frames 301 to the lower housing 401 using screws, as shown in FIGS. 13A and 13B or with other fastening means as may be appropriate. FIGS. 13A and 13B show a region B in FIG. 9. In FIGS. 13A and 13B, the light-sourcing unit fixing frames 301 and the lower housing 401 are coupled to each other by screws.

Referring to FIG. 13A, the first bent portion 440 of the lower housing 401 is inserted into an extension portion 330 and a fixing protrusion 340 of each of the light-sourcing unit fixing frames 301. The lower housing 401 includes a protrusion portion 470a which protrudes downward, and an extension hole 475 is formed inside the protrusion portion 470a. Here, screws S1 are inserted into each of the light-sourcing unit fixing frames 301 in a direction from under each of the light-sourcing unit fixing frames 301, thereby fixing the bottom portion 410 of the lower housing 401 to the extension portion 330 of each of the light-sourcing unit fixing frames 301. Extension hole 475 may be pre-threaded to receive screw S1.

The area of the extension hole 475 formed inside the protrusion portion 470a may be large enough to allow each of the screws S1 to be fixed to the extension hole 475, thereby securely fixing the lower housing 401 and the light-sourcing unit fixing frames 301 to each other.

Referring to FIG. 13B, screws S1' may be inserted into the lower housing 401 in a direction from inside the lower housing 401. The screws S1' may penetrate the bottom portion 410 and the extension portion 330, thereby fixing the light-sourcing unit fixing frames 301 to the protrusion portion 470b of the lower housing 401. Here, when the extension portion 330 is thick, the screws S1' may not pass through the extension portion 330.

Referring to FIG. 14, the light source wiring 133 (made of insulated wires) is shown extending from each of the light sourcing units 130 and coming out of a corresponding one of the light-sourcing unit fixing frames 301 through the wiring insertion groove 370 which is formed at a side of the corresponding one of the light-sourcing unit fixing frames 301.

The wiring insertion groove 370 may be cut from a side of each of the light-sourcing unit fixing frames 301 and extend in the rear surface of each of the light-sourcing unit fixing frames 301. Accordingly, the wiring 133 may be exposed outside each of the light-sourcing unit fixing frames 301 through the wiring insertion groove 370 and may be made to extend to a desired position while being fixed in place by the wiring insertion groove 370.

FIG. 15 is a view for explaining light-sourcing unit fixing frames 300a used in a display device according to another exemplary embodiment. For simplicity, the differences between the light-sourcing unit fixing frames 300a according to the current exemplary embodiment and the light-sourcing unit fixing frames 300 (see FIG. 4) according to the previous exemplary embodiment of FIG. 4 will mainly be described.

Referring to FIG. 15, while the lateral protrusion portion 330 (see FIG. 4) of each of the light-sourcing unit fixing frames 300 (see FIG. 4) has a uniform width. On the other hand, a protrusion portion 330a of each of the light-sourcing unit fixing frames 300a may have a non-uniform width.

The width of the protrusion portion 330a may vary according to distribution of heat generation. For example, the protrusion portion 330a may be wide in a region where a relatively large amount of heat is generated and may be narrower in a region where a relatively smaller amount of heat is generated. When the width of the protrusion 330a varies according to the distribution of heat generation, heat generated in the display device can be spread easily.

In FIG. 15, a width W1 of a corner portion 330b of the protrusion portion 330a is greater than a width W2 of a middle portion 330c of the protrusion portion 330a. However, the present teachings are not limited thereto. In the case of FIG. 15, heat generated by the corner portion 330b is spread to other regions, thereby reducing thermal stress of the corner portion 330b.

Although not shown in the drawings, a fixing wall of each of the light-sourcing unit fixing frames 300a, which supports a circuit board 131 of a light sourcing unit, may physically contact a side of the lower housing.

Figure 16:
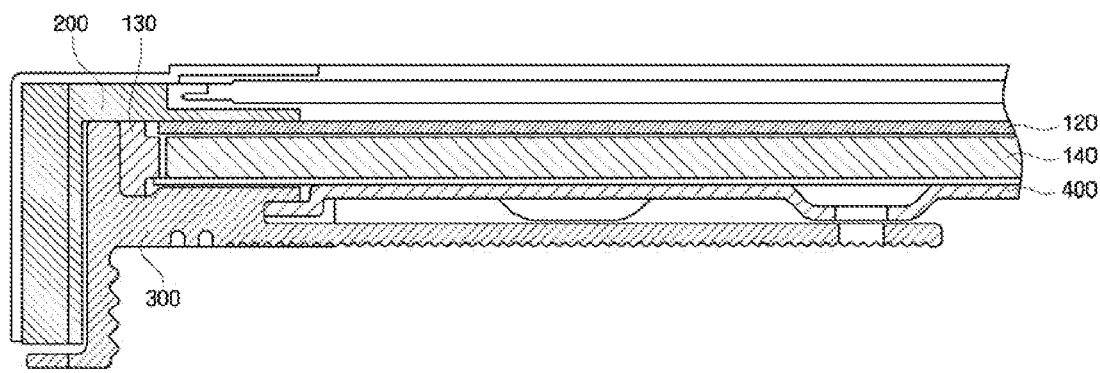
FIG. 16 is a cross-sectional view of a display device according to another exemplary embodiment.

FIG. 16 is a cross-sectional view of a display device according to another exemplary embodiment.

Referring to FIG. 16, in the display device according to the current exemplary embodiment, a pattern is formed on a lower surface of each of light-sourcing unit fixing frames 300.

Therefore, an increase in the exposed surface area of each of the light-sourcing unit fixing frames can bring about better heat dissipation effect.

The protrusion portion 210 of the intermediate frame 200 which is behind each of the light sourcing units 130 in the display device according to the previous exemplary embodiment of FIG. 2 is omitted from the display device according to the current exemplary embodiment, and the second fixing groove 360 of each of the light-sourcing unit fixing frames 300 in the display device according to the previous exemplary embodiment of FIG. 2 is omitted from the display device according to the current exemplary embodiment. As a result, the width of the display device can be reduced.

In addition, each end of the intermediate frame 200 contacts the optical sheets 120 in the display device according to the previous exemplary embodiment of FIG. 2. However, in the display device according to the current exemplary embodiment, a lower surface of the intermediate frame 200 contacts the optical sheets 120.

Unlike in the previous exemplary embodiment of FIG. 9, in the current exemplary embodiment, a side of each of the light-sourcing unit fixing frames 300 may not protrude further than that of the intermediate frame 200, thereby improving the appearance of the display device.

While the present disclosure of invention has been particularly shown and described with reference to exemplary embodiments thereof, it will be understood by those of ordinary skill in the pertinent art and in light of the foregoing that various changes in form and detail may be made without departing from the spirit and scope of the teachings. The exemplary embodiments should be considered in a descriptive sense only and not for purposes of limitation.

What is claimed is:

1. A display device comprising:
a display panel which displays an image;
a light sourcing unit which provides light to the display panel;
an light-sourcing unit fixing frame to which the light sourcing unit is fixed; and
a housing having a interior portion and an exterior portion, the interior portion being configured to accommodate the light-sourcing unit fixing frame therein, where the housing has an aperture portion communicating being the interior and exterior portions,
wherein part of the light-sourcing unit fixing frame is exposed to the exterior portion of the housing by way of the aperture portion,
wherein the housing comprises a bottom plate portion and sidewall portions extending from the bottom portion,
wherein the light-sourcing unit fixing frame comprises an extension portion which is parallel to the bottom plate portion, a fixing protrusion which fixes at least one of sides of the aperture portion,
wherein the fixing protrusion of the light-sourcing unit fixing frame extends parallel to the extension portion of the light-sourcing unit fixing frame, and wherein at least part of the bottom plate portion of the housing is inserted between the fixing protrusion and the extension portion,
wherein the light-sourcing unit fixing frame comprises a horizontal portion which extends parallel to the bottom plate portion and a vertical portion which extends substantially perpendicular to the horizontal portion,
wherein the extension portion extends from an end of the horizontal portion,
wherein the fixing protrusion is formed at the end of the horizontal portion and is separated from the extension portion.

2. The display device of claim 1, wherein the aperture portion is formed in the bottom portion, and the extension portion is exposed through the aperture portion and overlaps the bottom portion.

3. The display device of claim 1, wherein the vertical portion is exposed outside the housing.

4. The display device of claim 1, wherein the extension portion is exposed through the aperture portion and overlaps at least part of the bottom portion, wherein the bottom portion and the extension portion are coupled to each other by at least one of welding, screws, and caulking.

* * * * *